(12) United States Patent
Pan

(10) Patent No.: US 10,379,375 B2
(45) Date of Patent: Aug. 13, 2019

(54) QUICK-RELEASE CONNECTING ASSEMBLY FOR SPECTACLES

(71) Applicant: GRANDVISION GROUP HOLDING B.V., Schiphol (NL)

(72) Inventor: Jingqing Pan, Shenzhen (CN)

(73) Assignee: GRANDVISION GROUP HOLDING B.V., Schiphol (NL)

( * ) Notice: Subject to any disclaimer, the term of this patent is extended or adjusted under 35 U.S.C. 154(b) by 0 days.

(21) Appl. No.: 15/556,635

(22) PCT Filed: Mar. 23, 2016

(86) PCT No.: PCT/EP2016/056454
§ 371 (c)(1),
(2) Date: Sep. 8, 2017

(87) PCT Pub. No.: WO2016/151049
PCT Pub. Date: Sep. 29, 2016

(65) Prior Publication Data
US 2018/0059435 A1    Mar. 1, 2018

(30) Foreign Application Priority Data
Mar. 25, 2015 (CN) ............ 2015 2 0173072 U

(51) Int. Cl.
*G02C 5/14* (2006.01)
*A44B 11/26* (2006.01)

(52) U.S. Cl.
CPC ............ *G02C 5/146* (2013.01); *A44B 11/263* (2013.01); *G02C 2200/04* (2013.01);
(Continued)

(58) Field of Classification Search
CPC ...... G02C 5/14; G02C 5/146; G02C 2200/04; G02C 2200/06; G02C 2200/08;
(Continued)

(56) References Cited

U.S. PATENT DOCUMENTS 2,905,992 A * 9/1959 Swick ............ F16B 5/06
                                               24/581.1
3,200,464 A * 8/1965 Cousins .......... A41F 1/006
                                                24/593.1
(Continued)

FOREIGN PATENT DOCUMENTS

CN      204374545      6/2015
DE   20 2009 005 206   12/2009
FR       2875609       3/2006

OTHER PUBLICATIONS

International Search Report for PCT/EP2016/056454 dated Aug. 1, 2016.
Written Opinion for PCT/EP2016/056454 dated Aug. 1, 2016.

*Primary Examiner* — Darryl J Collins
(74) *Attorney, Agent, or Firm* — Nixon Peabody LLP; Jeffrey L. Costellia

(57) ABSTRACT

A quick-release connecting assembly, including a spring core and a socket, said spring core including a sleeve-connected elastic portion and a clamping boss set on said sleeve-connected elastic portion; one end of said socket is opened to form a hole adapted to receive the spring core plugged into and a hole wall surrounding said hole. A clamping slot is adapted to receive said clamping boss formed in said hole wall, said slot determining an abutment edge for abutting the clamping boss. A push member is located in correspondence to said clamping boss and is set on the socket at the clamping slot, said sleeve-connected elastic portion being arranged to elastically engage the clamping boss with the abutment edge when the sleeve-connected elastic portion of the spring core is plugged into the hole of the socket.

15 Claims, 2 Drawing Sheets

(52) U.S. Cl.
CPC ..... *G02C 2200/08* (2013.01); *G02C 2200/22* (2013.01); *Y10T 24/45529* (2015.01)

(58) Field of Classification Search
CPC .............. G02C 2200/22; A44B 11/263; Y10T 24/45524; Y10T 24/45529; Y10T 24/45534
USPC .............. 351/111, 116, 119, 121; 24/573.11, 24/581.1, 593.1, 593.11, 594.1, 594.11, 24/598.1
See application file for complete search history.

(56) References Cited

U.S. PATENT DOCUMENTS

| | | | |
|---|---|---|---|
| 8,690,318 B2 * | 4/2014 | Tian | G02C 5/16 |
| | | | 16/228 |
| 2004/0160570 A1 * | 8/2004 | Polovin | G02C 5/10 |
| | | | 351/111 |
| 2004/0217139 A1 | 11/2004 | Roth et al. | |
| 2011/0239417 A1 | 10/2011 | Yu | |
| 2012/0050667 A1 * | 3/2012 | Wang | G02C 5/10 |
| | | | 351/158 |
| 2015/0160473 A1 * | 6/2015 | Tormen | G02C 5/00 |
| | | | 351/116 |

* cited by examiner

QUICK-RELEASE CONNECTING ASSEMBLY FOR SPECTACLES

TECHNICAL FIELD

The present invention relates to spectacles, and more particularly to a connecting assembly used in spectacles to releasably connect the front frame and the temples of such spectacles.

BACKGROUND ART

The connecting piece (also known as hinge) used to connect the frame and a temple is an important component in spectacles. The connecting piece in spectacles is generally a hinge screw. The hinge screw can effectively connect a temple and the frame. It is difficult to disassemble or assemble a spectacle where the temple and the frame are connected with a hinge screw because an auxiliary tool such as screwdriver or any other tool is required, however. When the frame or a temple needs to be replaced, the user usually needs to go to a spectacles store to replace it. This brings great inconvenience to the user. On the other hand, as the spectacle industry is developing towards a direction of fashion, consumers set a higher demand for the diversity of spectacle models. For this reason, spectacles with removable frames and temples have emerged in the market.

Generally, in known such spectacles, a socket is set on the temple and an elastic means such that a spring core able to be removably plugged into the socket is set on the frame.

When a spectacle is assembled, the spring core is first plugged into the socket, and then a clamping boss on the spring core is pushed against an edge of a clamping slot in the socket wall and is fastened to complete the connection and positioning of the frame and the temple. Such spectacles can be disassembled and assembled quickly. In the connection state, the frame and the temple can surely be fixed as long as the clamping boss is pushed against the edge of the clamping slot and is fastened. Such a structure is still deficient, however. The major problem is that a great force to be applied to the clamping boss on the spring core can be needed to release the fastening between the frame and the temple when the positioning has to be relieved, that being due to the need to push deeply on the clamping boss to sufficiently disengage it from the clamping slot, which is particularly difficult in consequence of the small dimensions of said slot when the user operates with his finger tip. This undoubtedly increases the operation difficulty and also can easily cause a damage during operations.

SUMMARY OF THE INVENTION

As mentioned above, it is difficult to remove the connecting piece between the frame and a temple in the prior art. The technical problem to be solved by the present invention is to provide a quick-release connecting assembly and spectacles having such quick-release connecting assembly, so that the frame and temples can be disassembled and assembled more easily, quickly and safely.

To solve the above-mentioned technical problem, the present invention proposes the following technical solution:

A quick-release connecting assembly according to the invention comprises a spring core and a socket; said spring core comprises a sleeve-connected elastic portion and a clamping boss is set on said sleeve-connected elastic portion;

One end of said socket is opened to form a hole adapted to receive the spring core plugged into and a hole wall surrounding said hole, a clamping slot adapted to receive said clamping boss is formed in said hole wall, said slot determining an abutment edge for abutting the clamping boss, and a push member located in correspondence to said clamping boss is set on the socket at the clamping slot, said sleeve-connected elastic portion being arranged to elastically engage the clamping boss with the abutment edge when the sleeve-connected elastic portion of the spring core is plugged into the hole of the socket, and said push member being arranged to push down and release the clamping boss out of its abutment with the abutment edge of the clamping slot when submitted to an external pressure.

When the quick-release connecting assembly implements a connection, the spring core is plugged into the hole of the socket, and the clamping boss of the sleeve-connected elastic portion retracts under the action of the interior wall of the hole and recovers upon reaching the clamping slot to realize a clamping match by abutment of the clamping boss to the abutment edge of the slot.

When the quick-release connecting assembly is to be released, a pressure is applied to the push member on the socket, the push member pushes against the clamping boss of the sleeve-connected elastic portion to release the clamping boss from its abutment to the abutment edge, the clamping of the spring core being thus released from the clamping slot, and the spring core is taken out of the socket.

Thus it will be easily understood that the use of the push member according to the present invention greatly facilitates the disassembling of the temples from the front frame, by making easier to disengage the clamping boss out of the clamping slot by simply pushing on the push member protruding from the socket.

The advantageous effects of the present invention lie in that the user only needs to push the push member to transfer the force to the clamping boss of the spring core to make it retract and then take out the spring core when removing the spring core from the socket. This not only improves the convenience of the disassembly and assembly of the spectacles, but also avoids the potential safety problem caused by a direct push on the clamping boss of the spring core in prior structures during a disassembly or assembly.

Preferably, the sleeve-connected elastic portion of said spring core is in the shape of a U, and the clamping boss is set on a first arm of the U-shaped sleeve-connected elastic portion.

According to a preferred embodiment, the spring core further comprises a pivot connection portion arranged to rotationally connect the sleeve-connected elastic portion, for example to the front frame. In this embodiment, the pivot connection portion is connected to the second arm of the U-shaped sleeve-connected elastic portion.

Preferably, the push member of said socket is connected to the edge of the clamping slot opposed to the abutment edge with an elastic connecting piece. Said elastic connecting piece is preferably made of an elastic leaf which extend substantially over the surface of the clamping slot, thus covering the opening formed by said clamping slot and consequently covering and dissimulating at the view the clamping boss and the sleeve-connected elastic portion when the assembly is connected. That allows a more aesthetic aspect of the assembly and also prevents any object or dirt to enter the socket hole when the assembly is connected.

Preferably, the top surface area of said push member is greater than the area of the clamping boss of the spring core, thus allowing the pressure sensed by the user's finger when pushing to disassemble to be reduced.

Preferably, the top surface of said push member protrudes out of the external surface of the socket, thus facilitating the pushing onto the push member without needing the user's finger to penetrate in the clamping slot.

According to a further optional embodiment, the clamping boss can comprise a stop tooth that comes in abutment under the abutment edge of the clamping slot, thus restraining the clamping boss to the correct clamping position when it recovers its clamping position when clamping of the assembly is achieved. Thus, any excessive displacement of the clamping boss outwards of the clamping slot that could occur upon an unfortunate too high pull force on the assembly is avoided.

The present invention further relates to a type of spectacles, which comprise a frame, temples, and the above-mentioned quick-release connecting assembly, wherein the spring core and socket of the quick-release connecting assembly are set on said frame and temple, respectively.

The edge of said frame is pivotaly mounted on the spring core of said quick-release connecting assembly, and said socket is fixed on the inner side of the edge of said temple.

While this represents a preferred embodiment, it should be also possible that the spring core and socket be inversely set on said temple and frame, respectively.

DESCRIPTION OF REFERENCE NUMBERS OF MEMBERS

1-Spring core, 2-Socket, 100-Frame, 200-Temple, 11-Pivot connection portion, 12-Sleeve-connected elastic portion, 13-Clamping boss, 20-hole, 201-hole wall, 21-Clamping slot, 22-Elastic connecting piece, 23-Push member

DETAILED DESCRIPTION OF THE UTILITY MODEL

The following describes the technical contents, structural features, objects, and effects of an embodiment of the present invention in relation with the drawings.

Figure 1:
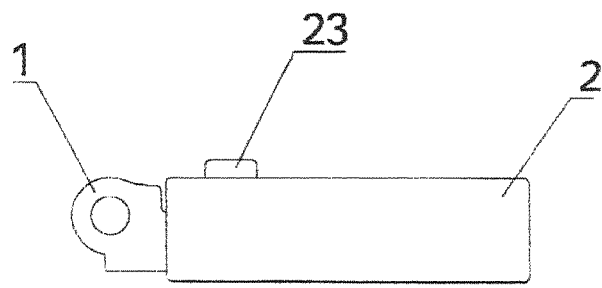
FIG. 1 shows the general structure of a quick-release connecting assembly according to the present invention when connected.

As shown in FIG. 1, the quick-release connecting assembly comprises a spring core 1 and a socket 2.

Figure 2:
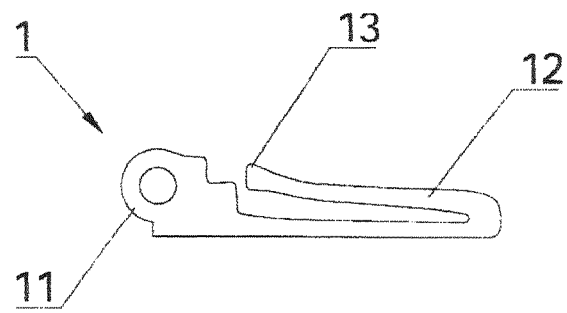
FIG. 2 is a side view of the spring core of the quick-release connecting assembly.
Figure 3:
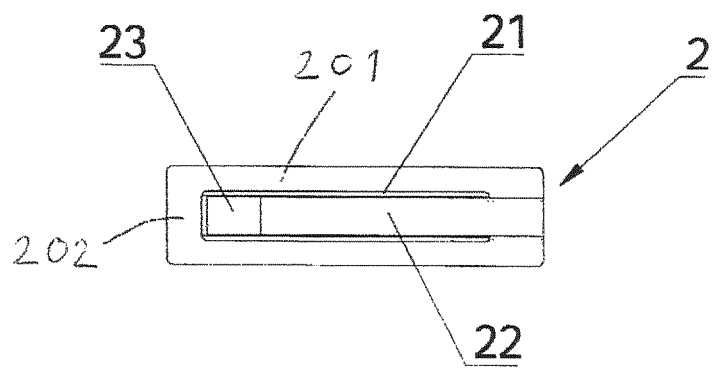
FIG. 3 is a top view of the socket of the quick-release connecting assembly.

As shown in FIG. 2, said spring core 1 comprises a sleeve-connected elastic portion 12 having a U-shape, and a clamping boss 13 is set on said sleeve-connected elastic portion 12, at the end of one first arm of said U-shaped elastic portion 12. Said spring core 1 further comprises a pivot connection portion 11 connected to the second arm of the U-shaped elastic portion 12. The pivot connection portion 11 is arranged to rotationally connect the spring core 1 to the frame 100, as can be seen on FIGS. 6 and 7. So the pivot connection portion 11 provides a substrate to facilitate the fixing and connection of the external part of spring core to the frame 100, for instance by means of screws.

The structure of the U-shaped sleeve-connected elastic portion 12 is simple and has a self-recovery elasticity itself.

Figure 4:
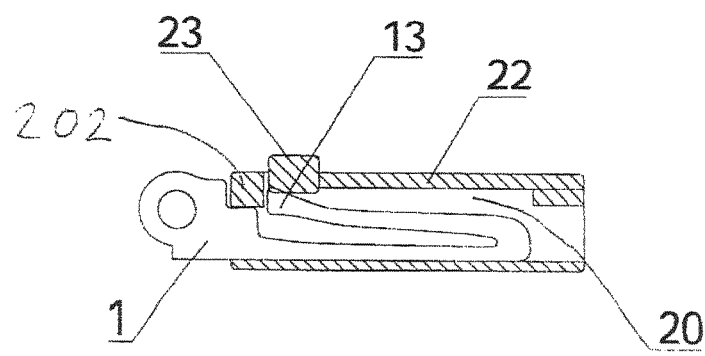
FIG. 4 is a cutaway view of the spring core positioned in the socket of the quick-release connecting assembly.
Figure 5:
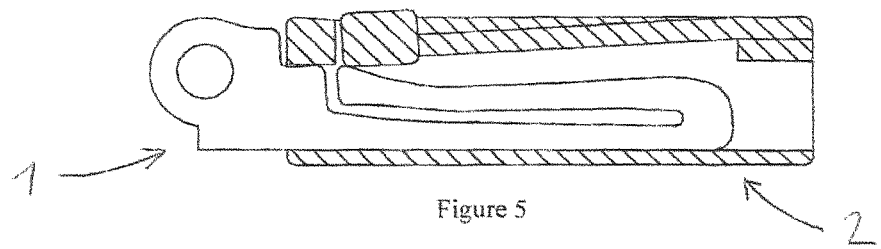
FIG. 5 is a cutaway view of the spring core in the PUSH state in the socket of the quick-release connecting assembly.
Figure 6:
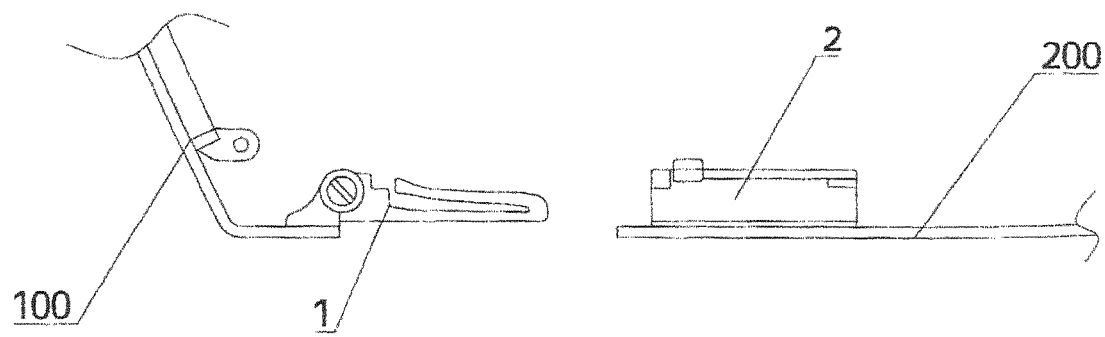
FIG. 6 is schematic diagram for the structure of spectacles according to the present invention, in a disconnected state of the temple with respect to the frame.

As shown in FIG. 4 to 6, one end of said socket 2 is opened to form a hole 20 adapted to receive the spring core 1 and a hole wall 201 surrounding said hole. A clamping slot 21 adapted to receive, passing through it, said clamping boss 13 of the sleeve-connected elastic portion 12 is set in said hole wall 201, and a push member 23 is set on the clamping slot 21 in correspondence to said clamping boss 13.

The push member 23 is connected to the hole wall of the socket at an edge of the clamping slot 21 with an elastic connecting piece 22, for example made from an elastic leaf. Thus, the push member 23 can play a positioning role under the action of the connection piece. In addition, the connecting piece 22 can play a role of a draw board during operations. It will be noticed that the top surface of said push member 23 protrudes out of the external surface of the socket 2 when the spring core is engaged in the socket, in an engaged position as shown on FIGS. 1 and 4.

When an external force is applied, by a user's finger for instance, a certain displacement is allowed to occur to the push member 23, and when the external force is removed, the push member itself springs back to the original, engaged position, or returns to the engaged position under the action of the clamping boss of the spring core.

In a further embodiment, the top surface area of said push member 23 can be greater than the top area of the clamping boss 13 of the spring core 1.

The greatest advantage of using the push member and its connecting piece 22 is that the structure and form of the push member can be designed as required, without being restricted by the volume of the spring core. A greater top surface area of the push member than the top area of the clamping boss can lower the pressure required on the operation area, and thus a good operation feel is ensured. The top surface protruding out of the external surface of the socket makes it easier to push the push member and further enhances the disassembly/assembly convenience of the product and the operation feel. Furthermore, the use of the connecting piece 22 bearing the push member allows to cover and to hide the clamping boss and the sleeve-connected elastic portion when the assembly is connected. That allows a more aesthetic aspect of the assembly, either when the assembly is connected or disconnected.

As shown in FIG. 4 and FIG. 5, when the quick-release connecting assembly implements a connection, the sleeve-connected elastic portion 12 of the spring core 1 is plugged into the hole 20 of the socket 2, and the clamping boss 13 of the spring core retracts under the action of the end part 202 of the wall of the hole, said end part determining the abutment edge for the clamping boss, then recovers upon reaching the clamping slot 21 to realize a clamping match, the clamping boss 13 then clamping against said abutment edge.

To release the connection, a pressure is applied to the push member 23, the push member 23 pushes against the clamping boss 13 of the sleeve-connected elastic portion to release the clamping from the clamping slot 21, as shown in FIG. 5 and the spring core 1 can be taken out of the socket 2.

Since the push member 23 is set on the socket 2, the user only needs to push the push member 23 to transfer the force to the clamping boss 13 of the spring core 1 to make it retract when removing the spring core 1 from the socket 2. This not only improves the use convenience, but also avoids the potential safety problem caused by a direct push on the clamping boss of the spring core 1 in prior structures.

Figure 7:
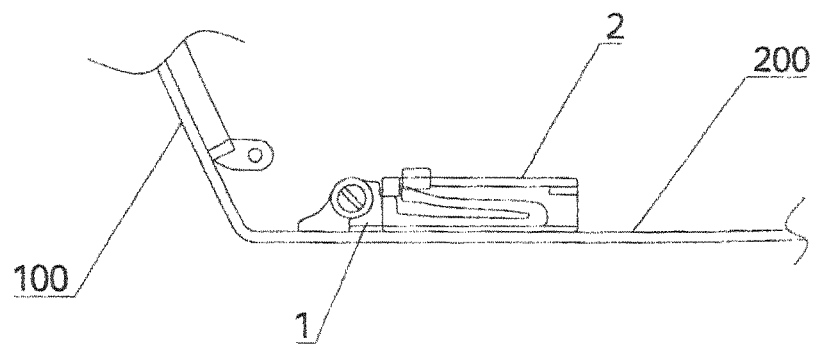
FIG. 7 is schematic diagram for the structure of the spectacles, in a connected state.

As shown in FIG. 6 and FIG. 7, the present invention further relates to a type of spectacles, which comprise a frame 100, temples 200, and the above-mentioned quick-release connecting assembly, wherein the spring core 1 and socket 2 of the quick-release connecting assembly are set on said frame 100 and temple 200, respectively.

The edge of said frame 100 is pivoted on the spring core 1 of said quick-release connecting assembly, and said socket 2 is fixed on the inner side of the edge of said temple 200. Grace to the use of the spring core 1 and the socket 2, the frame 100 and the temple 200 can be disassembled, assembled, or replaced quickly, conveniently, and safely.

Figure 8:
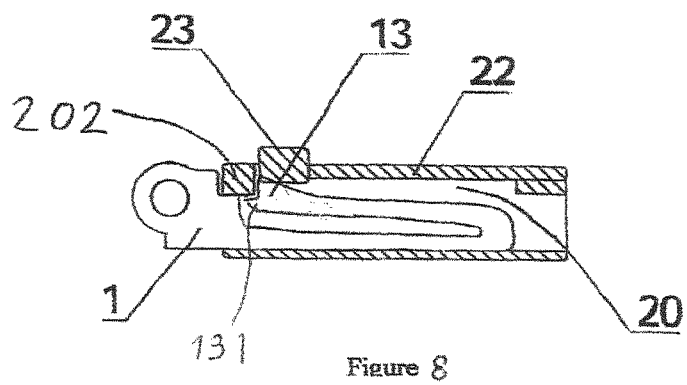
FIG. 8 shows a further optional embodiment of the quick-release connecting assembly.

FIG. 8 shows a further optional embodiment of the quick-release connecting assembly, wherein the clamping boss 13 comprises a stop tooth 131 that comes in abutment under the abutment edge 202 of the clamping slot 21, thus restraining the clamping boss to the correct clamping position when clamping of the assembly is achieved.

The above description is only an embodiment of the present invention, but is not intended for confining the claim scope of the present invention. All equivalent structural or process variants based on the contents in the description and drawings of the present invention, or the direct or indirect application of the contents in the description and drawings of the present invention to other relevant technical fields should also be included in the claim scope of the present invention.

The invention claimed is:

1. A quick-release connecting assembly, comprising a spring core and a socket, said spring core comprising a sleeve-connected elastic portion and a clamping boss set on said sleeve-connected elastic portion, one end of said socket is opened to form a hole adapted to receive the spring core plugged into and a hole wall surrounding said hole, a clamping slot adapted to receive said clamping boss is formed in said hole wall, said slot determining an abutment edge for abutting the clamping boss, and wherein a push member located in correspondence to said clamping boss is set on the socket at the clamping slot, said sleeve connected elastic portion being arranged to elastically engage the clamping boss with the abutment edge when the sleeve-connected elastic portion of the spring core is plugged into the hole of the socket, and said push member being arranged to push down and release the clamping boss out of its abutment with the abutment edge of the clamping slot when submitted to an external pressure,
wherein the push member of said socket is connected to the edge of the clamping slot opposed to the abutment edge with an elastic connecting piece.

2. The quick-release connecting assembly according to claim 1, wherein the sleeve-connected elastic portion of said spring core is in the shape of a U, and the clamping boss is set on a first arm of the U-shaped sleeve-connected elastic portion.

3. The quick-release connecting assembly according to claim 2, wherein said spring core further comprises a pivot connection portion arranged to rotationally connect the sleeve-connected elastic portion, the pivot connection portion being connected to a second arm of the U-shaped sleeve-connected elastic portion.

4. The quick-release connecting assembly according to claim 1, wherein the elastic connecting piece is made of an elastic leaf which extend substantially over the surface of the clamping slot.

5. The quick-release connecting assembly according to claim 1, wherein the top surface area of said push member is greater than the area of the clamping boss of the spring core.

6. The quick-release connecting assembly according to claim 1, wherein the top surface of said push member protrudes out of the external surface of the socket.

7. The quick-release connecting assembly according to claim 1, wherein the clamping boss comprise a stop tooth that comes in abutment under the abutment edge of the clamping slot, thus restraining the clamping boss to the correct clamping position when clamping of the assembly is achieved.

8. A type of spectacles, comprising: a frame, temples, and a quick-release connecting assembly described in claim 1, wherein the spring core and the socket of said quick-release connecting assembly are set on said frame and temple, respectively.

9. The spectacles according to claim 8, wherein the edge of said frame is pivoted on the spring core of said quick-release connecting assembly, and said is fixed on the inner side of the edge of said temple.

10. A type of spectacles, comprising:
a frame, temples, and a quick-release connecting assembly, comprising a spring core and a socket, said spring core comprising a sleeve-connected elastic portion and a clamping boss set on said sleeve-connected elastic portion, one end of said socket is opened to form a adapted to receive the spring core plugged into and a hole wall surrounding said hole, a clamping slot adapted to receive said clamping boss is formed in said hole wall, said slot determining an abutment edge for abutting the clamping boss, and wherein a push member located in correspondence to said clamping boss is set on the socket at the clamping slot, said sleeve-connected elastic portion being arranged to elastically engage the clamping boss with the abutment edge when the sleeve-connected elastic portion of the spring core is plugged into the hole of the socket, and said push member being arranged to push down and release the clamping boss out of its abutment with the abutment edge of the clamping slot when submitted to an external pressure, wherein the push of said socket is connected to the edge of the clamping slot opposed to the abutment edge with an elastic connecting piece,
wherein the elastic connecting piece is made of an elastic leaf which extend substantially over the surface of the clamping slot, and wherein the spring core and the of said quick-release connecting assembly are set on said frame and temple, respectively,
wherein the top surface area of said push member is greater than the area of the clamping boss of the spring core.

11. The spectacles according to claim 10, wherein the sleeve-connected elastic portion of said spring core is in the shape of a U, and the clamping boss is set on a first arm of the U-shaped sleeve-connected elastic portion.

12. The spectacles according to claim 11, wherein said spring core further comprises a pivot connection arranged to rotationally connect the sleeve-connected elastic portion, the pivot connection portion being connected to a second arm of the U-shaped sleeve-connected elastic portion.

13. The spectacles according to claim 10, wherein the top surface of said push member protrudes out of the external surface of the socket.

14. The spectacles according to claim 10, wherein the clamping boss comprise a stop tooth that comes in abutment under the abutment edge of the clamping slot, thus restraining the clamping boss to the correct clamping position when clamping of the assembly is achieved.

15. The spectacles according to claim 10, wherein the edge of said frame is pivoted on the spring core of said quick-release connecting assembly, and said socket is fixed on the inner side of the edge of said temple.

* * * * *